(12) United States Patent
Tov et al.

(10) Patent No.: US 11,496,563 B2
(45) Date of Patent: Nov. 8, 2022

(54) SYSTEM AND METHOD FOR MIGRATING VOLUMES BETWEEN STORAGE APPLIANCES

(71) Applicant: EMC IP Holding Company, LLC, Hopkinton, MA (US)

(72) Inventors: Marina Shem Tov, Hod Hasharon (IL); Chen Reichbach, Tel Aviv (IL); Dmitry Tylik, Westborough, MA (US); Mukesh Gupta, Shrewsbury, MA (US)

(73) Assignee: EMP IP Holding Company, LLC, Hopkinton, MA (US)

( * ) Notice: Subject to any disclaimer, the term of this patent is extended or adjusted under 35 U.S.C. 154(b) by 85 days.

(21) Appl. No.: 17/068,249

(22) Filed: Oct. 12, 2020

(65) Prior Publication Data

US 2022/0116451 A1 Apr. 14, 2022

(51) Int. Cl.
*H04L 67/1061* (2022.01)
*G06F 3/06* (2006.01)

(52) U.S. Cl.
CPC ........ *H04L 67/1068* (2013.01); *G06F 3/0607* (2013.01); *G06F 3/0647* (2013.01); *G06F 3/0688* (2013.01)

(58) Field of Classification Search
CPC .............. H04L 67/1068; G06F 3/0607; G06F 3/0647; G06F 3/0688
See application file for complete search history.

(56) References Cited

U.S. PATENT DOCUMENTS 10,462,012 B1 * 10/2019 Rao ....................... G06F 3/0604

* cited by examiner

*Primary Examiner* — Andrew C Georgandellis
(74) *Attorney, Agent, or Firm* — Brian J. Colandreo; Mark H. Whittenberger; Holland & Knight LLP (57) ABSTRACT

A method, computer program product, and computing system for generating, at a first storage appliance of a plurality of storage appliances, a first volume that is configured to be managed by the first storage appliance, wherein data within the first volume is accessible by the first storage appliance. In response to generating the first volume, a protocol identifier representation of the first volume may be generated at each other storage appliance of the plurality of storage appliances and may be configured to be managed by a respective storage appliance of the plurality of storage appliances.

17 Claims, 7 Drawing Sheets

SYSTEM AND METHOD FOR MIGRATING VOLUMES BETWEEN STORAGE APPLIANCES

BACKGROUND

Storing and safeguarding electronic content may be beneficial in modern business and elsewhere. Accordingly, various methodologies may be employed to protect and distribute such electronic content.

As storage systems advance with new storage technologies and protocols, migration of customer data from one storage system to another remains a constant challenge. However, existing procedures for migrating volumes from one storage appliance to another storage appliance of a storage cluster may not be visible to a host and may introduce host interoperability issues.

For example, conventional approaches for migrating volumes often require a user (e.g., a storage administrator) of a particular host device to scan for new volumes and/or storage protocol paths. Creating a new volume as a destination volume does not automatically discover a storage protocol path between a host and the destination volume. In this manner, conventional approaches require significant user intervention because a user (e.g., a storage administrator) must scan for new storage protocol paths when migrating data to a destination volume. Accordingly, the creation and migration of data to a destination volume may not be transparent to a host.

Additionally, conventional approaches to data migration across storage appliances in a cluster may introduce host interoperability issues when utilizing the NVMe storage protocol. For example, the NVMe Specification allows for a dynamic controller model and shared access to NVMe namespaces within the same NVMe Subsystem. The dynamic controller model may require that all controllers allocated to a specific host have the same state at the time the association is established, including attached namespaces and feature settings. This requirement may be interpreted as requiring all NVMe controllers attached to a host within the same NVMe Subsystem to report identical active namespace lists irrespective of the physical location of a port/controller within the NVMe Subsystem. Accordingly, this requirement may introduce host interoperability within a storage cluster utilizing the NVMe storage protocol.

SUMMARY OF DISCLOSURE

In one example implementation, a computer-implemented method executed on a computing device may include, but is not limited to, generating, at a first storage appliance of a plurality of storage appliances, a first volume that is configured to be managed by the first storage appliance, wherein data within the first volume is accessible by the first storage appliance. In response to generating the first volume, a protocol identifier representation of the first volume may be generated at each other storage appliance of the plurality of storage appliances and may be configured to be managed by a respective storage appliance of the plurality of storage appliances.

One or more of the following example features may be included. Generating the first volume for the first storage appliance may include generating the first volume in a cluster management layer of the plurality of storage appliances. Generating the protocol identifier representation of the first volume for each other storage appliance of the plurality of storage appliances may include generating the protocol identifier representation of the first volume in one or more of an appliance management layer of each storage appliance of the plurality of storage appliances and a front-end driver of each storage node of each storage appliance of the plurality of storage appliances. Generating the first volume may include associating one or more protocol identifiers with the first volume. Generating the protocol identifier representation of the first volume may include associating the one or more protocol identifiers with the protocol identifier representation of the first volume. A migration command may be received, at the first storage appliance, to move the data from the first volume managed by the first storage appliance to the protocol identifier representation of the first volume that is configured to be managed by a second storage appliance. The protocol identifier representation of the first volume that is configured to be managed by the second storage appliance may be converted, via the second storage appliance, into a second volume. Data from the first volume may be migrated to the second volume. In response to migrating the data from the first volume to the second volume, the first volume may be converted, via the first storage appliance, into a protocol identifier representation of the second volume.

In another example implementation, a computer program product resides on a computer readable medium that has a plurality of instructions stored on it. When executed by a processor, the instructions cause the processor to perform operations that may include, but are not limited to, generating, at a first storage appliance of a plurality of storage appliances, a first volume that is configured to be managed by the first storage appliance, wherein data within the first volume is accessible by the first storage appliance. In response to generating the first volume, a protocol identifier representation of the first volume may be generated at each other storage appliance of the plurality of storage appliances and may be configured to be managed by a respective storage appliance of the plurality of storage appliances.

One or more of the following example features may be included. Generating the first volume for the first storage appliance may include generating the first volume in a cluster management layer of the plurality of storage appliances. Generating the protocol identifier representation of the first volume for each other storage appliance of the plurality of storage appliances may include generating the protocol identifier representation of the first volume in one or more of an appliance management layer of each storage appliance of the plurality of storage appliances and a front-end driver of each storage node of each storage appliance of the plurality of storage appliances. Generating the first volume may include associating one or more protocol identifiers with the first volume. Generating the protocol identifier representation of the first volume may include associating the one or more protocol identifiers with the protocol identifier representation of the first volume. A migration command may be received, at the first storage appliance, to move the data from the first volume managed by the first storage appliance to the protocol identifier representation of the first volume that is configured to be managed by a second storage appliance. The protocol identifier representation of the first volume that is configured to be managed by the second storage appliance may be converted, via the second storage appliance, into a second volume. Data from the first volume may be migrated to the second volume. In response to migrating the data from the first volume to the second volume, the first volume may be converted, via the first storage appliance, into a protocol identifier representation of the second volume.

In another example implementation, a computing system includes at least one processor and at least one memory architecture coupled with the at least one processor, wherein the at least one processor is configured to generate, at a first storage appliance of a plurality of storage appliances, a first volume that is configured to be managed by the first storage appliance, wherein data within the first volume is accessible by the first storage appliance. The at least one processor may be further configured to, in response to generating the first volume, generate, at each other appliance of the plurality of storage appliances, a protocol identifier representation of the first volume that is configured to be managed by a respective storage appliance of the plurality of storage appliances.

One or more of the following example features may be included. Generating the first volume for the first storage appliance may include generating the first volume in a cluster management layer of the plurality of storage appliances. Generating the protocol identifier representation of the first volume for each other storage appliance of the plurality of storage appliances may include generating the protocol identifier representation of the first volume in one or more of an appliance management layer of each storage appliance of the plurality of storage appliances and a front-end driver of each storage node of each storage appliance of the plurality of storage appliances. Generating the first volume may include associating one or more protocol identifiers with the first volume. Generating the protocol identifier representation of the first volume may include associating the one or more protocol identifiers with the protocol identifier representation of the first volume. A migration command may be received, at the first storage appliance, to move the data from the first volume managed by the first storage appliance to the protocol identifier representation of the first volume that is configured to be managed by a second storage appliance. The protocol identifier representation of the first volume that is configured to be managed by the second storage appliance may be converted, via the second storage appliance, into a second volume. Data from the first volume may be migrated to the second volume. In response to migrating the data from the first volume to the second volume, the first volume may be converted, via the first storage appliance, into a protocol identifier representation of the second volume.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
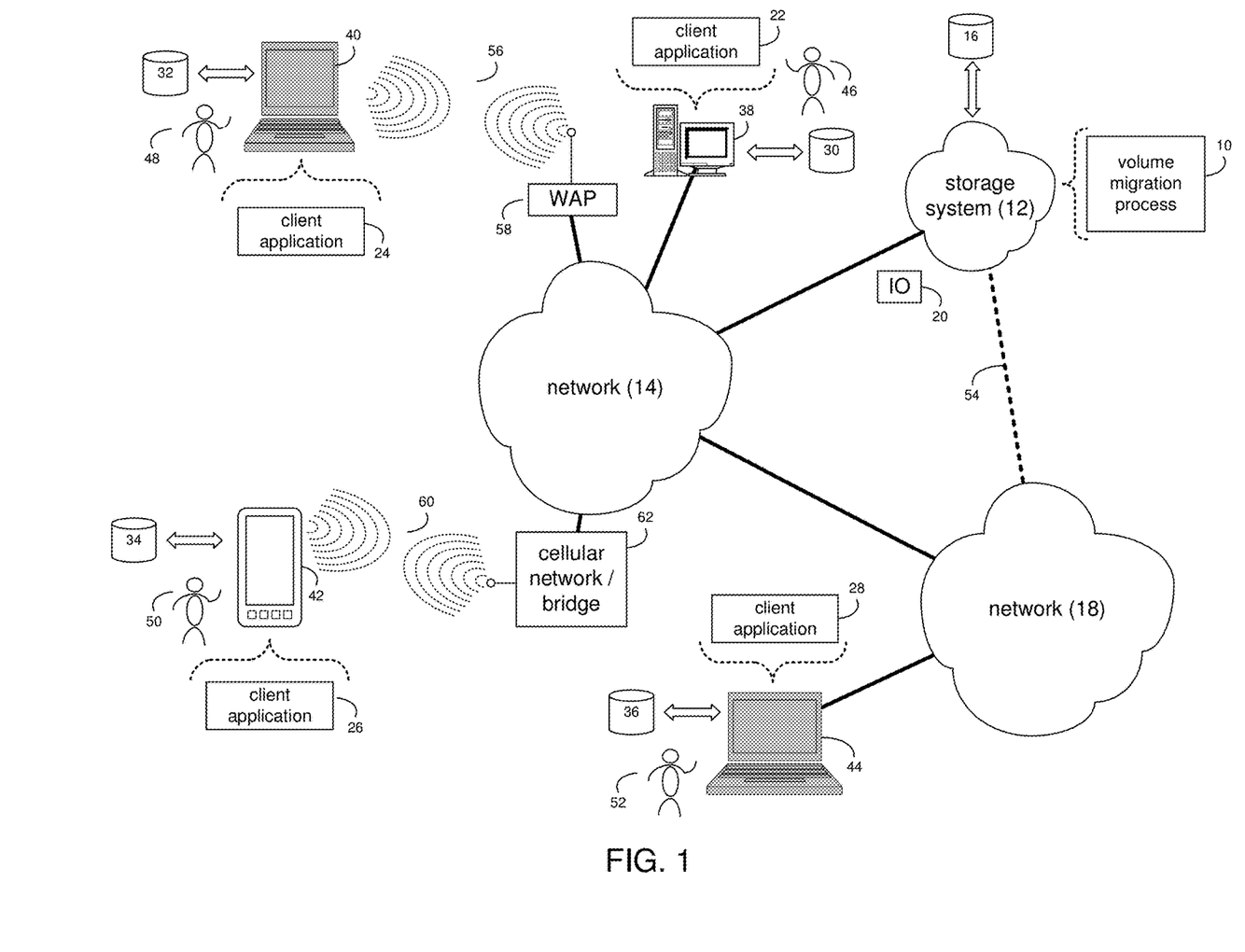
FIG. 1 is an example diagrammatic view of a storage system and a volume migration process coupled to a distributed computing network according to one or more example implementations of the disclosure.

Referring to FIG. 1, there is shown volume migration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of volume migration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of volume migration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a volume migration process, such as volume migration process 10 of FIG. 1, may include but is not limited to, generating, at a first storage appliance of a plurality of storage appliances, a first volume that is configured to be managed by the first storage appliance, wherein data within the first volume is accessible by the first storage appliance. In response to generating the first volume, a protocol identifier representation of the first volume may be generated at each other storage appliance of the plurality of storage appliances and may be configured to be managed by a respective storage appliance of the plurality of storage appliances.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
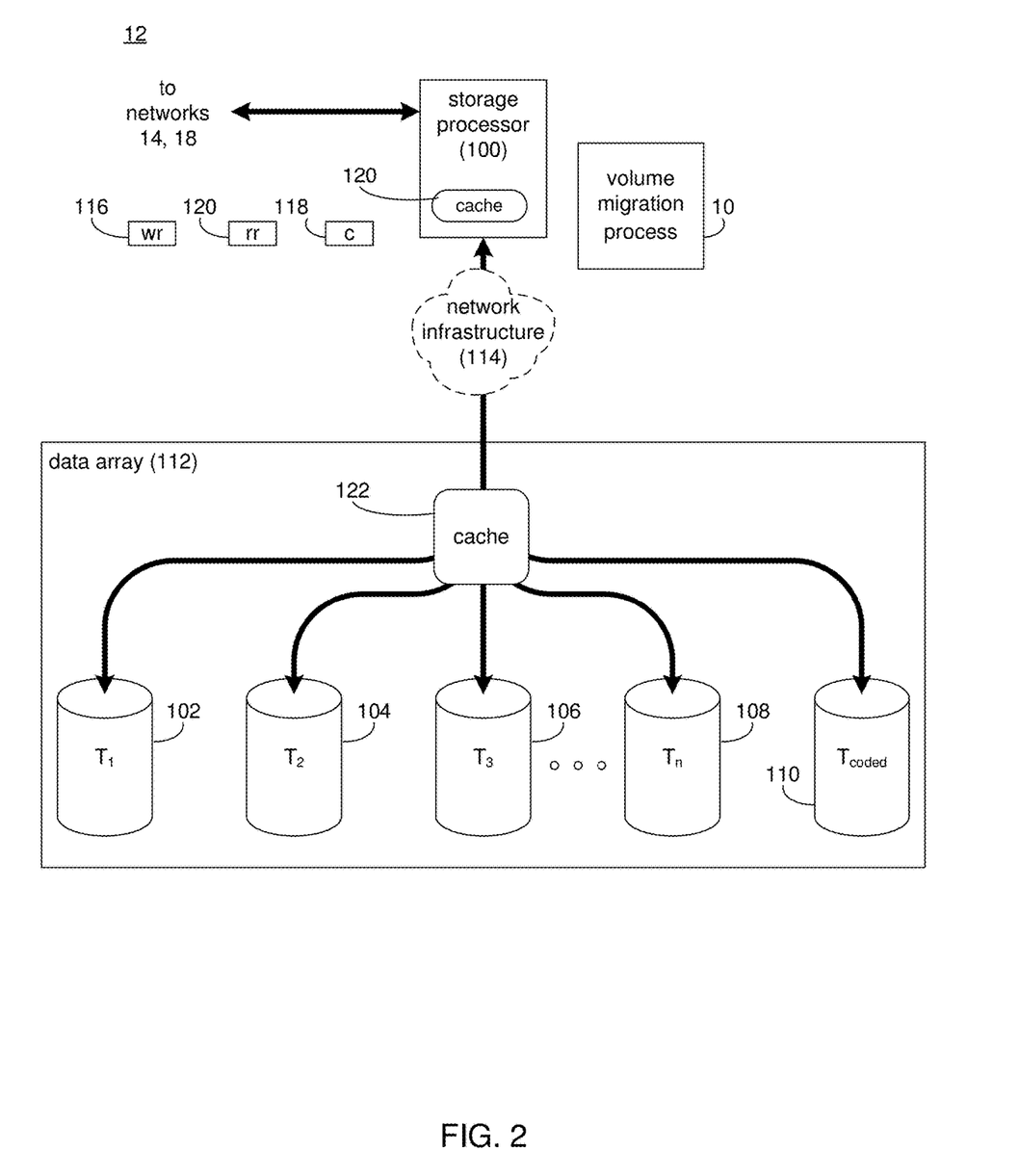
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of volume migration process 10. The instruction sets and subroutines of volume migration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of volume migration process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of volume migration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of volume migration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
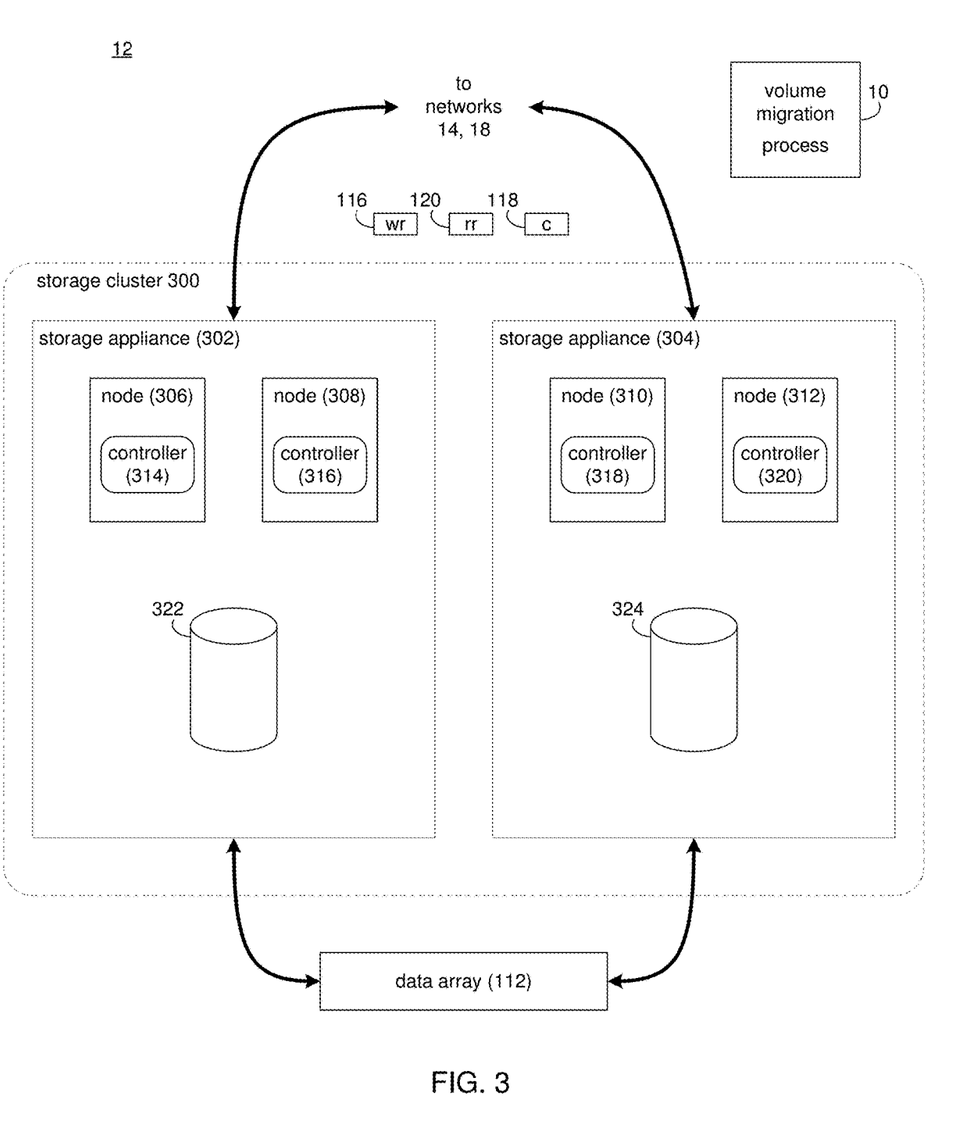

The Storage Cluster:

Referring also to FIG. 3, storage system 12 may include a storage cluster (e.g., storage cluster 300) of storage appliances (e.g., storage appliances 302, 304). A cluster of storage appliances (e.g., storage cluster 300) may generally include a Federation composed of multiple appliances, where each storage appliance (e.g., storage appliances 302, 304) may include a plurality of (e.g., at least two) connected nodes/storage processors (e.g., nodes 306, 308, 310, 312) with shared back-end drives (e.g., data array 112) running a storage stack that communicate over a network. In some implementations, each node may include one or more storage controllers (e.g., controllers 314, 316, 318, 320) configured for processing host IO operations on one or more volumes (e.g., volumes 322, 324) managed by a storage appliance.

In some implementations and as will be discussed in greater detail below, each storage appliance may have its own captive storage (e.g., volumes) that are managed by the storage appliance. In some implementations, a volume managed by one storage appliance may not be accessible from any other storage appliance. For example, volume 322 may be managed by storage appliance 302 and volume 324 may be managed by storage appliance 304. In this example, volume 322 may not be accessible by storage appliance 304 and volume 322 may not be accessible by storage appliance 302.

In some implementations, each storage appliance (e.g., storage appliances 302, 304) may be communicatively coupled to a back-end storage array (e.g., data array) via various storage protocols (e.g., Small Computer System Interface (SCSI) (iSCSI), Fibre Channel, Non-Volatile Memory Express (NVMe) over Fabric (NVMe-oF), etc.). As is known in the art, NVMe or NVM Express® is a specification defining how host software communicates with non-volatile memory across a PCI Express® (PCIe®) bus. As will be discussed in greater detail below, a storage protocol may generally include standards or protocols for physically connecting and transferring data between computing devices and peripheral devices. In some implementations, a storage protocol path may generally include a hardware and/or software communication link between a computing devices and peripheral devices.

The Volume Migration Process:

Referring also to the examples of FIGS. 4-7 and in some implementations, volume migration process 10 may generate 400, at a first storage appliance of a plurality of storage appliances, a first volume that is configured to be managed by the first storage appliance, wherein data within the first volume is accessible by the first storage appliance. In response to generating the first volume, a protocol identifier representation of the first volume may be generated 402 at each other storage appliance of the plurality of storage appliances and may be configured to be managed by a respective storage appliance of the plurality of storage appliances.

As will be discussed in greater detail below, implementations of the present disclosure may allow for transparent volume migration by avoiding host "rescan" operations and may solve storage protocol specification compliance for potential host compatibility without any risk and dependency on host software implementations. Referring again to the example of FIG. 3, consider a storage cluster (e.g., storage cluster 300) of storage appliances (e.g., storage appliances 302, 304). Suppose a user (e.g., a storage administrator) desires to migrate a volume (e.g., volume 322) accessible via storage appliance 302 to storage appliance 304. In this example, a new volume (e.g., volume 324) may be created in storage appliance 304. However, conventional approaches for migrating volumes often require a user (e.g., a storage administrator) of a particular host device to scan for storage protocol paths. For example, in the example of FIG. 3, creating a new volume as a destination volume does not automatically discover a storage protocol path between a host and the destination volume. For example, while the destination volume (e.g., volume 324) and the source volume (e.g., volume 322) may appear to a host as the same volume, conventional approaches require significant user intervention because a user (e.g., a storage administrator) must scan for new storage protocol paths when migrating data to the destination volume. Accordingly, the creation and migration of data to a destination volume may not be transparent to a host with conventional approaches.

In some implementations, conventional approaches may introduce host interoperability issues when utilizing the NVMe storage protocol. For example, the NVMe Specification allows for a dynamic controller model and shared access to NVMe namespaces within the same NVMe Subsystem. The dynamic controller model may require that all controllers allocated to a specific host have the same state at the time the association is established, including attached namespaces and feature settings. This requirement may be interpreted as requiring all NVMe controllers attached to a host within the same NVMe Subsystem to report identical active namespace lists irrespective of the physical location of a port/controller within the NVMe Subsystem. Accordingly, this requirement may introduce host interoperability within a cluster utilizing the NVMe storage protocol.

As will be discussed in greater detail below, implementations of the present disclosure may allow for transparent volume migration by avoiding host "rescan" operations and may avoid any host interoperability issues when utilizing NVMe or any other NVMe-based storage protocol or extension of NVMe (e.g., NVMe-oF, etc.) by generating protocol identifier representations of volumes managed by other storage appliances, on each storage appliance.

In some implementations, volume migration process 10 may generate 400, at a first storage appliance of a plurality of storage appliances, a first volume that is configured to be managed by the first storage appliance, wherein data within the first volume is accessible by the first storage appliance. Referring also to the example of FIG. 5 and in some implementations, a first storage appliance (e.g., first storage appliance 302) may be configured to generate 400 a first volume (e.g., first volume 500) that is configured to be managed by the first storage appliance (e.g., first storage appliance 302). In some implementations, a volume (e.g., first volume 500) may generally include a storage container configured for storing data. In some implementations, volume migration process 10 may define a storage capacity for the first volume (e.g., first volume 500). In some implementations, the storage capacity may be pre-defined, user-defined (e.g., via a graphical user interface), and/or defined automatically by volume migration process 10. As will be discussed in greater detail below, the first volume (e.g., first volume 500) may be configured to store data from the one or more hosts.

Figure 5:
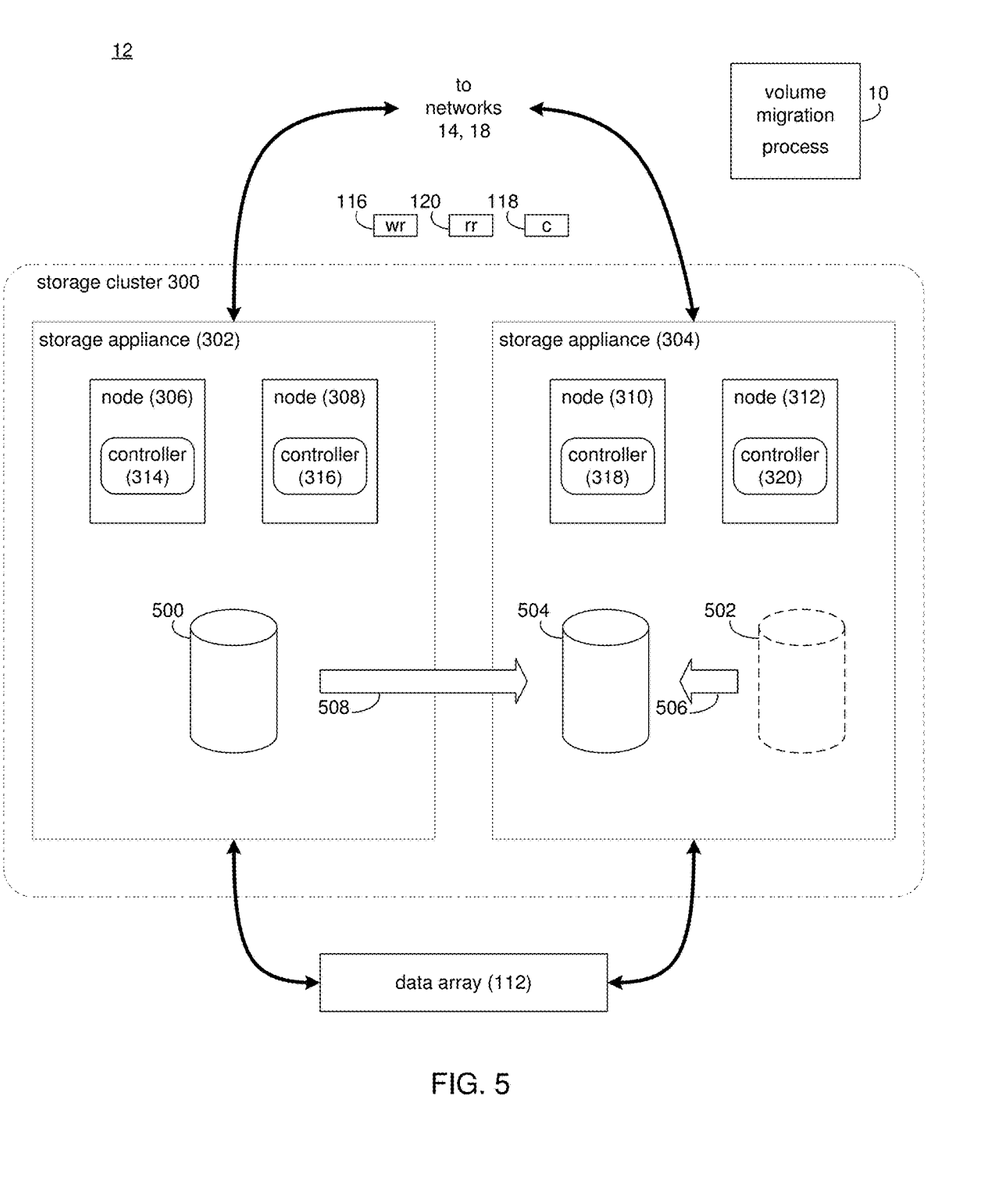
FIG. 5 is an example diagrammatic view of the storage system of FIG. 1 according to one or more example implementations of the disclosure.

As discussed above and in some implementations, a volume may be defined for various storage protocols. For example, when utilizing a SCSI storage protocol, generating 400 the first volume may include generating or allocating a first Logical Unit Number (LUN) that is configured to be managed by first storage appliance 302. As is known in the art, a LUN may generally include is a number used to identify a Logical Unit (LU), which is a formatted logical block. In another example and when utilizing a NVMe storage protocol, generating 400 the first volume may include generating or allocating a first namespace that is configured to be managed by first storage appliance 302. As is known in the art, a NVMe namespace may generally include a portion of non-volatile memory (NVM) that may be formatted into logical blocks. As will be discussed in greater detail below, a namespace identifier (NSID) may be used to identify a particular namespace. While examples have been provided for SCSI LUNs and NVMe Namespaces, it will be appreciated that any storage protocol may be used within the scope of the present disclosure.

In some implementations, managing the first volume via the first storage appliance may generally include performing various operations on the first volume (e.g., generating the first volume, writing data to the first volume, reading data from the first volume, deleting data from the first volume, etc.). In some implementations, a volume may be managed by a single storage appliance at a given time.

In some implementations, generating 400 the first volume may include associating 404 one or more protocol identifiers with the first volume. A protocol identifier may generally include a storage protocol-specific reference to a particular volume or other storage container. As discussed above and in some implementations, various storage protocols may be used to couple a host (e.g., client computing devices 38, 40, 42, 44) to storage devices (e.g., storage targets 102, 104, 106, 108, 110) within a storage array (e.g., data array 112). In one example, the NVMe storage protocol may be utilized to communicatively couple a host to storage devices within a storage array. For example, storage controllers may be configured for facilitating communication between storage devices and a storage appliance. However, it will be appreciated that other storage protocols may be used within the scope of the present disclosure.

Returning to the above example with the NVMe storage protocol, volume migration process 10 may configure the storage cluster (e.g., storage cluster 300) of storage appliances (e.g., storage appliances 302, 304) as a NVMe Subsystem. As defined in the NVMe Specification, a volume or other storage container may be a namespace and may be referenced by a namespace identifier (NSID). As is known in the art, a NSID is an identifier used by a controller to provide access to a namespace (e.g., a volume). Accordingly, in the NVMe storage protocol, a protocol identifier for a volume may be a NSID associated with the volume. In some implementations, a Namespace Globally Unique Identifier (NGUID) may be associated with and/or assigned to a namespace when the namespace is created. A NGUID may be preserved across namespace and controller operations (e.g. reset, format, etc.). While two examples of protocol identifiers have been provided for the NVMe storage protocol (e.g., NSID and NGUID), it will be appreciated that other protocol identifiers and/or other storage protocols may be used within the scope of the present disclosure.

In some implementations, volume migration process 10 may associate 404 one or more protocol identifiers with the first volume. For example, volume migration process 10 may associate 404 a NSID and a NGUID with first volume 500 when generating 400 first volume 500. In some implementations, multiple storage protocol paths may be formed between a host and a namespace or other storage container by utilizing the NSID and NGUID. In this manner, volume migration process 10 may allow for NVMe multipath connections between a host and a namespace. Accordingly, volume migration process 10 may define or generate multiple paths to a single volume or namespace. In some implementations and as will be discussed in greater detail below, volume migration process 10 may broadcast or otherwise share the one or more protocol identifiers with each controller or driver of a storage appliance.

For example and referring also to FIG. 5, volume migration process 10 may share the one or more protocol identifiers associated with first volume 500 with each controller (e.g., controllers 314, 316) of storage appliance 302. In this manner, each controller (e.g., controllers 314, 316 of storage appliance 302) may generate and utilize various storage protocol paths to first volume 500 by referencing the one or more protocol identifiers associated with first volume 500 (e.g., an NSID and an NGUID associated with first volume 500). While examples have been provided with reference to the NVMe storage protocol, it will be appreciated that other protocol identifiers of other storage protocols may be shared with various controllers of a storage appliance when generating 400 a volume.

Returning to the above example where volume migration process 10 generates 400 first volume 500 and utilizes the NVMe storage protocol, volume migration process 10 may allow a host to connect to various NVMe storage devices within storage cluster 300. In some implementations and as is known in the art, when a host attempts to connect, the NVMe discovery subsystem may report back all NVM subsystem ports across all storage appliances of the cluster (e.g., storage appliances 302, 304), allowing the host to connect to any of them. Upon connecting to a subsystem port, a dynamic controller may be created, through which the active attached namespaces may be exposed through an active namespace command of the NVMe storage protocol (e.g., the 'Identify Active Namespace List' command). In some implementations, each storage appliance may be configured to expose an 'Identify Active Namespace List' with the volumes or namespaces located at and/or managed by the storage appliance to the cluster. In this example, storage appliance 302 that generates 300 first volume 500 may return information associated with first volume 500 in response to an 'Identify Active Namespace List' command as storage appliance 302 is managing first volume 300. As will be discussed in greater detail below, volume migration process 10 may indicate an Asynchronous Namespace Access (ANA) state indicative that the volume is accessible though some paths\controllers and inaccessible though other paths\controllers.

Figure 4:
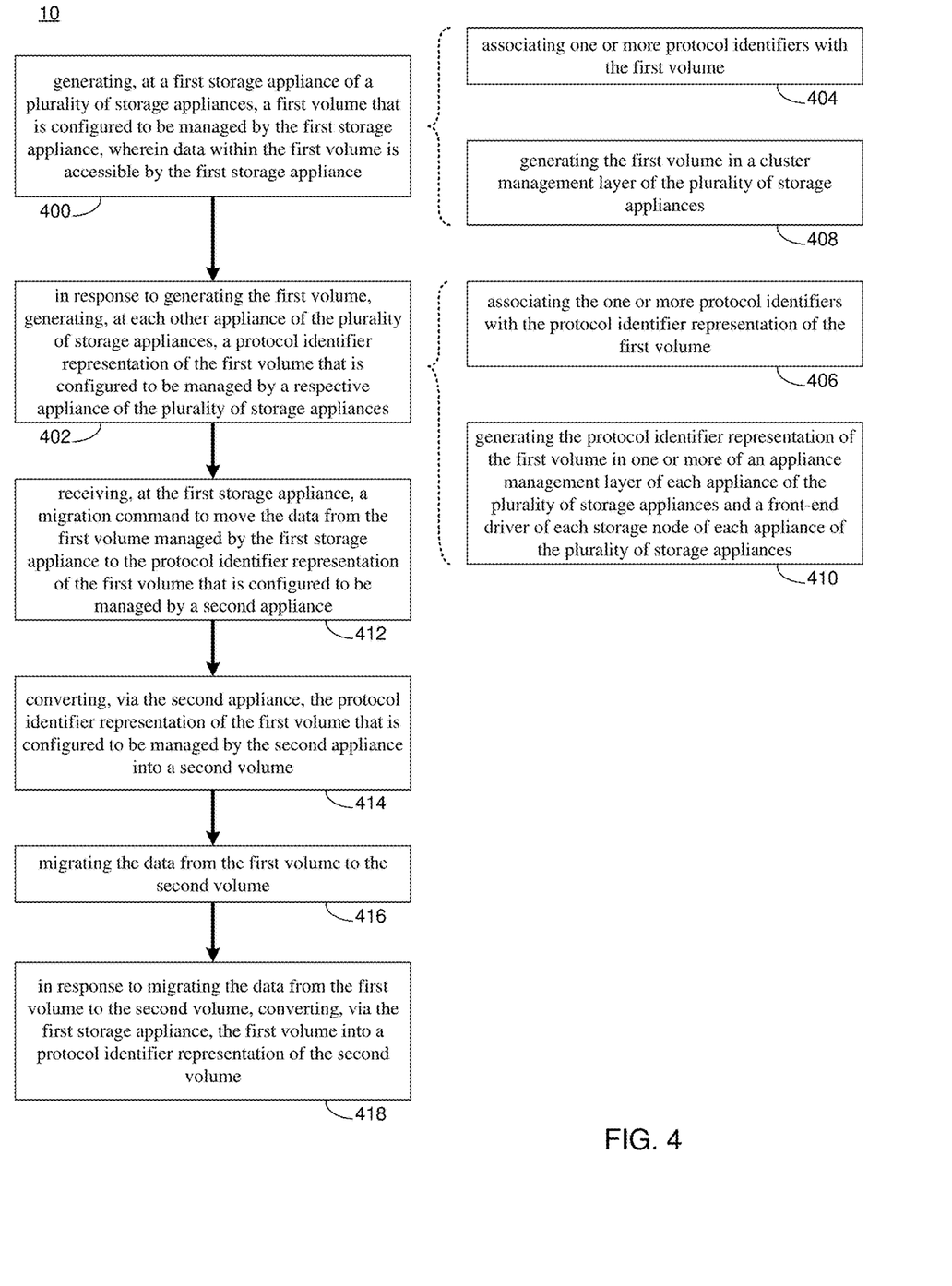
FIG. 4 is an example flowchart of volume migration process according to one or more example implementations of the disclosure.

In some implementations, volume migration process 10 may, in response to generating the first volume, generate 402, at each other storage appliance of the plurality of storage appliances, a protocol identifier representation of the first volume that is configured to be managed by a respective storage appliance of the plurality of storage appliances. A protocol identifier representation of a volume may generally include a representation of a volume with the same protocol identifier(s) as the volume and may not include data stored in the volume. In some implementations and as will be discussed in greater detail below, the protocol identifier representation of a volume may consume a minimal amount of memory at an appliance management layer associated with the storage appliance and may be configured to holds only information required to report the "Identify active namespace list" and "Identify Namespace" command.

Referring again to the example of FIG. 5 and in some implementations, volume migration process 10 may, in response to generating first volume 500 on storage appliance 302, generate 402, at each other storage appliance of the plurality of storage appliance (e.g., storage appliance 304), a protocol identifier representation of first volume 500 (e.g., protocol identifier representation 502) that is configured to be managed by a respective storage appliance of the plurality of storage appliances (e.g., storage appliance 302).

In some implementations, generating 402 the protocol identifier representation of the first volume may include associating 406 the one or more protocol identifiers with the protocol identifier representation of the first volume. As discussed above and in some implementations, protocol identifiers may generally include a storage protocol-specific reference to a particular volume or other storage container. In some implementations, volume migration process 10 may associate 406 each protocol identifier representation of the first volume with the one or more protocol identifiers of the first volume. In this manner, the first volume and the protocol identifier representation of the first volume may be referenced by the same protocol identifier. As will be discussed in greater detail below, by associating 406 the one or more protocol identifiers of the first volume with the protocol identifier representation of the first volume, any reference to data of the first volume (i.e., by the one or more protocol identifiers) may be consistent if and when the data is migrated to another volume managed by another storage appliance.

In some implementations, generating 400 the first volume for the first storage appliance may include generating 408 the first volume in a cluster management layer of the plurality of storage appliances. Referring also to the example of FIG. 6 and in some implementations, the organization and operation of a storage cluster (e.g., storage cluster 600) may include various management/software layers. A cluster management layer (e.g., cluster management layer 600) may include a management layer configured to organize and manage a storage cluster. An appliance management layer (e.g., appliance management layer 602) may generally include a management layer configured to organize and manage a storage appliance. A front-end driver (e.g., front-end driver 604) may generally include a driver configured to organize and manage a particular storage node.

Figure 6:
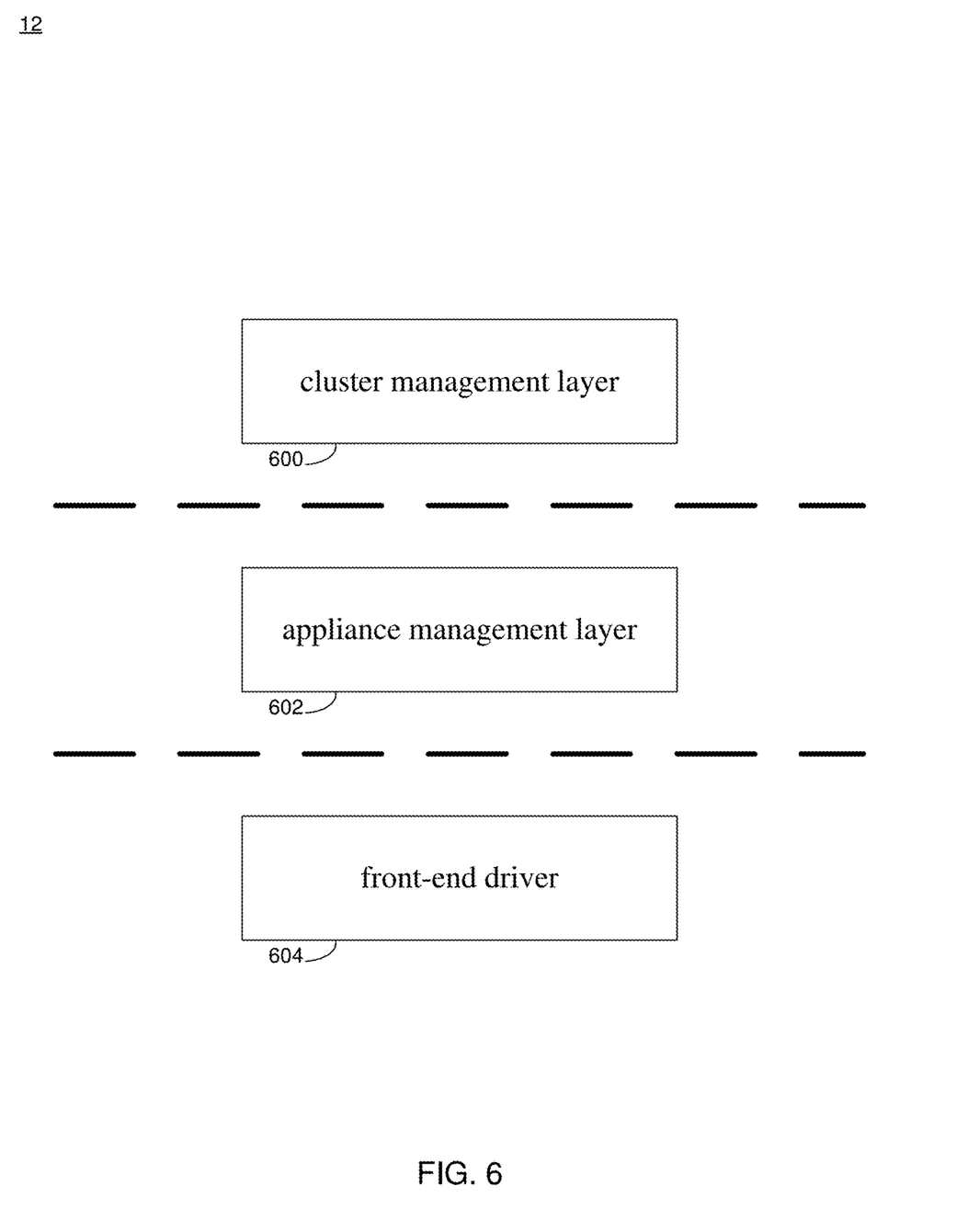
FIG. 6 is an example diagrammatic view of various management layers of the storage system of FIG. 1 according to one or more example implementations of the disclosure.

In some implementations, generating 400 first volume 500 may include generating 408 first volume 500 in cluster management layer 600 of the cluster. In some implementations, upon the generation of the first volume (e.g., first volume 500) and the attaching or mapping of the first volume to a host, the cluster management layer (e.g., cluster management layer 600) may send a command to the appliance management layer (e.g., appliance management layer 602) of the storage appliance (e.g., storage appliance 302) that hosts the volume (e.g., first volume 500) to create the volume with an optimized/non-optimized Asynchronous Namespace Access (ANA) state. As is known in the art, an ANA state may generally indicate whether the namespace is accessible or inaccessible. In this manner, volume migration process 10 may, when generating the first volume (e.g., first volume 500), define the ANA state for the first volume as "accessible."

In some implementations, generating 402 the protocol identifier representation of the first volume for each other appliance of the plurality of storage appliances may include generating 410 the protocol identifier representation of the first volume in one or more of an appliance management layer of each storage appliance of the plurality of storage appliances and a front-end driver of each storage node of each storage appliance of the plurality of storage appliances. Referring again to the example of FIG. 6 and in some implementations, appliance management layer 602 may be configured to organize and manage a storage appliance. In some implementations, volume migration process 10 may generate 410 the protocol identifier representation of the first volume in an appliance management layer of each storage appliance of the plurality of storage appliances (e.g., appliance management layer 602 of storage appliance 304). In some implementations, in response to generating 400 the first volume (e.g., first volume 500), cluster management layer 600 may send a command to the appliance management layer of all other storage appliances (e.g., storage appliance 602) to generate the protocol identifier representation of the first volume (e.g., protocol identifier representation 502).

In some implementations, volume migration process 10 may generate 410 the protocol identifier representation of the first volume in front-end driver of each node of each storage appliance of the plurality of storage appliances (e.g., front-end driver 604 of node 310 and front-end driver 604 of node 312 of storage appliance 304). In some implementations, in response to generating 400 the first volume (e.g., first volume 500), appliance management layer 602 may send a command to the front-end driver of each node to generate the protocol identifier representation of the first volume (e.g., protocol identifier representation 502). In this manner, the protocol identifier representation may not be generated at the cluster management layer but may be generated at one or more of the appliance management layer of each other storage appliance and the front-end driver of each node of each other storage appliance.

In some implementations, upon the generation of a protocol identifier representation of the first volume (e.g., protocol identifier representation 502), the cluster management layer (e.g., cluster management layer 600) may send a command to the appliance management layer (e.g., appliance management layer 602) of the other storage appliances (e.g., storage appliance 304) and/or the front-end driver (e.g., front-end driver 604) of the nodes of the other storage appliances that do not host the volume to create the protocol identifier representation of the first volume (e.g., protocol identifier representation 502) with an ANA state. In this manner, volume migration process 10 may, when generating the protocol identifier representation of the first volume (e.g., protocol identifier representation 502), define the ANA state for the protocol identifier representation of the first volume as "inaccessible."

In some implementations and as discussed above, when a host attempts to connect to the cluster, the NVMe discovery subsystem may report back all NVMe subsystem ports across all storage appliances of the cluster (e.g., storage appliances 302, 304), allowing the host to connect to any of them. Upon connecting to a subsystem port, a dynamic controller may be created, through which the active attached namespaces may be exposed through an active namespace command of the NVMe storage protocol (e.g., the 'Identify Active Namespace List' command). In some implementations, each storage appliance may be configured to expose an 'Identify Active Namespace List' with the volumes or namespaces located at and/or managed by the storage appliance to the cluster.

In this example, storage appliance 302 that generates 300 first volume 500 may return information associated with first volume 500 in response to an 'Identify Active Namespace List' command indicating that the first volume 500 is accessible as storage appliance 302 is managing first volume 300 and storage appliance 300 that generates 402 the protocol identifier representation of the first volume (e.g., protocol identifier representation 502) may return information associated with first volume 500 indicating that protocol identifier representation 502 is inaccessible. In this manner and as will be discussed in greater detail below, by generating a protocol identifier representation of the first volume on each other storage appliance, all NVMe controllers attached to a host within the same NVM Subsystem are enabled to report an identical active namespace list irrespective of the physical location of that port/controller.

In some implementations, in response generating 400 the first volume and generating 402 the protocol identifier representation of the first volume on each other storage appliance, volume migration process 10 may map one or more hosts to the first volume and the protocol identifier representation of the first volume based upon, at least in part, the one or more protocol identifiers associated with the first volume and the protocol identifier representation. For example, a host may send an active namespace command to the storage system. In response to receiving the active namespace command, the namespace associated with protocol identifier representation 502 may be returned with an indication that protocol identifier representation 502 is inaccessible (e.g., an ANA state of "inaccessible"). In some implementations, volume migration process 10 may map the one or more hosts to first volume 500 and protocol identifier representation 502. However, because only first volume 500 is defined as accessible, the one or more hosts may process host IO communications with first volume 500 that has access to the data.

In some implementations, volume migration process 10 may receive 412, at the first storage appliance, a migration command to move the data from the first volume managed by the first storage appliance to the protocol identifier representation of the first volume that is configured to be managed by a second storage appliance. In some implementations, a migration command may be received various sources (e.g., from a user (storage administrator) desiring to migrate data of a source volume to a destination volume; from an internal system or module seeking to load balance data across the storage cluster; from volume migration process 10; etc.). As such, it will be appreciated that a migration command may be received 412 from various sources for various reasons within the scope of the present disclosure. In some implementations, the migration command may include a reference to the source volume and/or a destination storage appliance. For example, the migration command may include the one or more protocol identifiers associated with the source volume.

In some implementations and in response to receiving the migration command, the cluster management layer (e.g., cluster management layer 600) may determine a destination storage appliance and may send a volume creation command to the appliance management layer (e.g., appliance management layer 602) of the destination storage appliance. The appliance management layer may determine whether the storage appliance has a protocol identifier representation corresponding to the source volume based upon, at least in part, the one or more protocol identifiers associated with the source volume. For example, as the protocol identifier representations of a given volume are generated with the same protocol identifiers as the volume, if the storage appliance has a protocol identifier representation associated with the same protocol identifiers as the source volume, volume migration process 10 may identify that protocol identifier representation as the destination volume.

Referring again to the example of FIG. 5, suppose volume migration process 10 receives 412 a migration command for migrating first volume 500 to storage appliance 304 based upon the one or more protocol identifiers associated with first volume 500. In this example, cluster management layer 600 may send a volume creation command to appliance management layer 602 of storage appliance 304. Appliance management layer 602 of storage appliance 304 may identify protocol identifier representation 502 as the destination volume in response to determining that protocol identifier representation 502 and first volume 500 have matching protocol identifiers.

In some implementations, volume migration process 10 may convert 414, via the second storage appliance, the protocol identifier representation of the first volume that is configured to be managed by the second storage appliance into a second volume. As discussed above and in some implementations, the protocol identifier representation identified as the destination volume may only be configured for storing the one or more protocol identifiers. As such, the protocol identifier representation may be unable to store data migrated from the source volume. Accordingly, volume migration process 10 may convert 414 the protocol identifier representation into a destination volume configured to store the data migrated from the source volume.

For example, the appliance management layer may convert 414 the protocol identifier representation into a destination volume by defining a storage capacity for the destination volume. In this manner, the destination volume may be configured to receive data migrated from the source volume. In some implementations, the appliance management layer of the destination storage appliance may be configured to provide commands to the front-end driver of each node to convert the protocol identifier representation to a destination volume. As will be discussed in greater detail below, the destination volume may become accessible to hosts after data is migrated from the source volume.

Referring again to FIG. 5 and again to the above example, suppose volume migration process 10 determines that protocol identifier representation 502 is the destination volume for the migration of first volume 500. In this example, volume migration process 10 may convert 414 protocol identifier representation 502 into a destination volume (e.g., second volume 504) represented by arrow 506 in FIG. 5. configured to receive data migrated from the source volume (e.g., first volume 500). As will be discussed in greater detail below, from a host's perspective, the source volume (e.g., volume 500) and the destination volume (e.g., volume 504) may appear to be the same volume.

In some implementations, volume migration process 10 may migrate 416 the data from the first volume to the second volume. Referring again to FIG. 5 and continuing with the above example, volume migration process 10 may migrate 416 data from the source volume (e.g., first volume 500) to the destination volume (e.g., second volume 504) as shown by arrow 508). In some implementations, volume migration process 10 may migrate 416 all data from first volume 500 but for the one or more protocol identifiers associated with first volume 500. In this manner, first volume 500 may still be referenced by the one or more protocol identifiers following the migration.

In some implementations and in response to migrating 416 the data from the source volume, volume migration process 10 may indicate that the destination volume is accessible (i.e., ANA state is "accessible"). In this manner, the protocol identifier representation may be converted into a destination volume that is accessible to the one or more hosts and has the data from the source volume. Additionally, because the mapping to the protocol identifier representation using the one or more protocol identifiers was defined when the source volume was generated, the destination volume may be accessible to the one or more hosts without requiring the hosts to rescan for the destination volume.

In some implementations, volume migration process 10 may, in response to migrating the data from the first volume to the second volume, convert 418, via the first storage appliance, the first volume into a protocol identifier representation of the second volume. In some implementations and in response to completing the migration of the data of the source volume to the destination volume, volume migration process 10 may convert 418 the source volume into a protocol identifier representation of the destination volume. In this manner, the original source volume may be configured to be a protocol identifier representation of the destination volume while retaining the protocol identifiers associated with the source volume. In this manner, the protocol identifier representation of the destination volume may be configured to be converted into a destination volume with the same protocol identifiers if data is migrated back to the original storage appliance.

Figure 7:
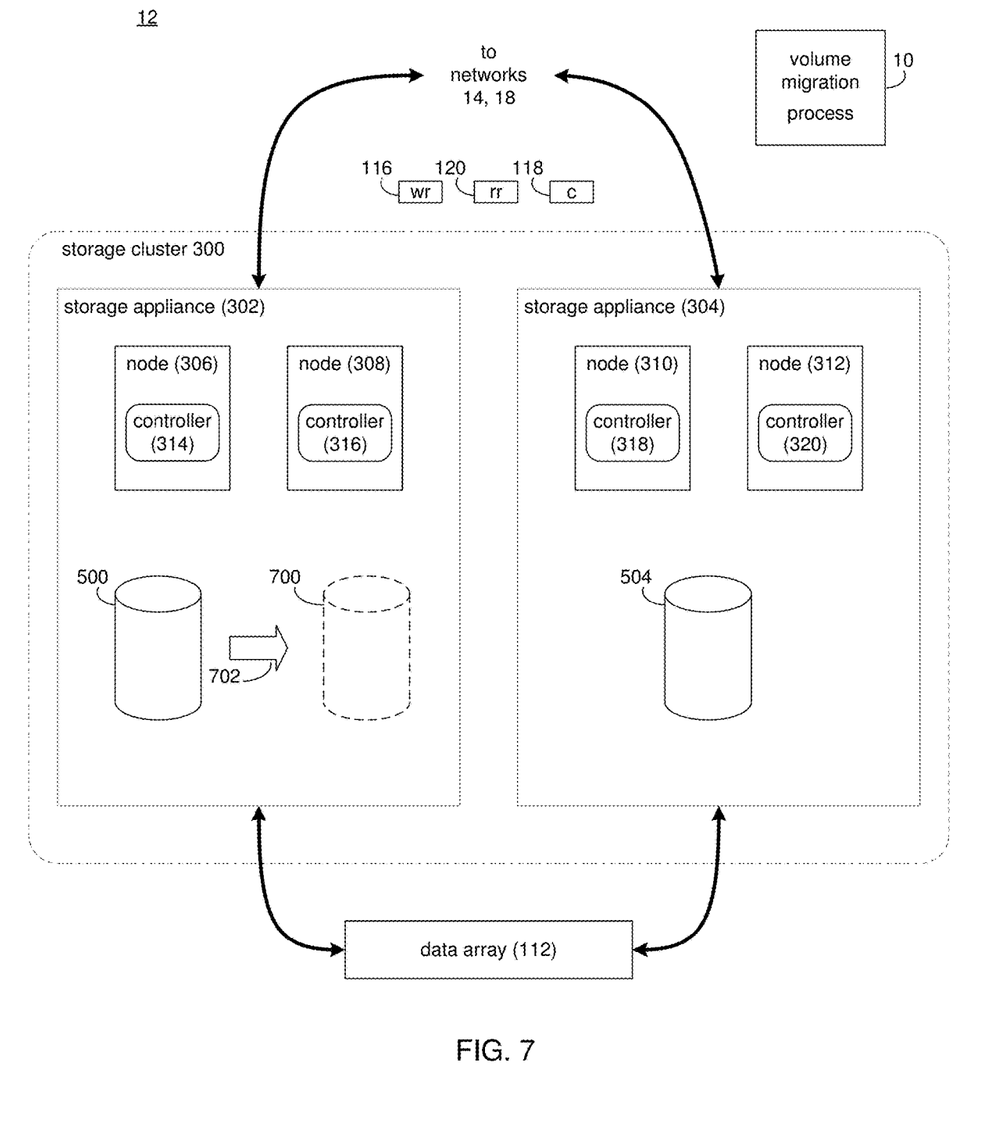
FIG. 7 is an example diagrammatic view of the storage system of FIG. 1 according to one or more example implementations of the disclosure.

Referring also to the example of FIG. 7, in response to determining that the data from first volume 500 has been migrated, volume migration process 10 may convert 418 first volume 500 by discarding the migrated data and reducing the storage capacity. For example, appliance management layer 602 of storage appliance 302 may convert 418 first volume 500 into a protocol identifier representation of second volume 504 (e.g., protocol identifier representation 700) represented in FIG. 7 by arrow 702. In this example, the migrated data may be discarded from first volume 500 and the storage capacity may be reduced such that protocol identifier representation 700 only retains the one or more protocol identifiers associated with second volume 504. In other words, by converting 414 protocol identifier representation 502 into second volume 504 and converting first volume 500 into protocol identifier representation 700, the source and destination volume may switch roles while appearing to hosts as a single volume and without requiring hosts to rescan for new volumes.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on one or more computing devices, comprising:
    generating, at a first storage appliance of a plurality of storage appliances, a first volume that is configured to be managed by the first storage appliance, wherein data within the first volume is accessible by the first storage appliance;
    in response to generating the first volume, generating, at each other appliance of the plurality of storage appliances, a representation volume that is configured to be managed by a respective storage appliance of the plurality of storage appliances, wherein the representation volume is configured to consume a minimal amount of memory at an appliance management layer associated with the storage appliance and is configured to only store information required to respond to at least one of an identify active namespace list NVMe command and an identify namespace NVMe command, wherein the representation volume includes at least one of a namespace ID (NSID) and a Namespace Globally Unique Identifier (NGUID);
    receiving, at the first storage appliance, a migration command to move the data from the first volume managed by the first storage appliance to a second volume managed by a second storage appliance;
    converting, via the second storage appliance, the representation volume that is configured to be managed by the second storage appliance into the second volume, wherein converting the representation volume into the second volume includes:
        defining the representation volume that is configured to be managed by the second storage appliance as the second volume, and
        increasing, via the appliance management layer, a storage capacity of the second volume; and
    migrating the data from the first volume to the second volume.

2. The computer-implemented method of claim 1, wherein generating the first volume for the first storage appliance includes generating the first volume in a cluster management layer of the plurality of storage appliances.

3. The computer-implemented method of claim 1, wherein generating the representation volume for each other storage appliance of the plurality of storage appliances includes generating the representation volume in one or more of an appliance management layer of each storage appliance of the plurality of storage appliances and a front-end driver of each storage node of each storage appliance of the plurality of storage appliances.

4. The computer-implemented method of claim 1, wherein generating the first volume includes associating at least one of a NSID and a NGUID with the first volume.

5. The computer-implemented method of claim 4, wherein generating the representation volume includes storing at least one of the NSID of the first volume and the NGUID of the first volume at the representation volume as the at least one of the NSID of the representation volume and the NGUID of the representation volume.

6. The computer-implemented method of claim 1, further comprising:
    in response to migrating the data from the first volume to the second volume, converting, via the first storage appliance, the first volume into a representation volume configured to be managed by the first storage appliance.

7. A computer program product residing on a non-transitory computer readable medium having a plurality of instructions stored thereon which, when executed by one or more processors, cause the one or more processors to perform operations comprising:
    generating, at a first storage appliance of a plurality of storage appliances, a first volume that is configured to be managed by the first storage appliance, wherein data within the first volume is accessible by the first storage appliance;
    in response to generating the first volume, generating, at each other appliance of the plurality of storage appliances, a representation volume that is configured to be managed by a respective storage appliance of the plurality of storage appliances, wherein the representation volume is further configured to consume only enough memory at an appliance management layer associated with the storage appliance to respond to at least one of an identify active namespace list NVMe command and an identify namespace NVMe command, wherein the representation volume includes at least one of a namespace ID (NSID) and a Namespace Globally Unique Identifier (NGUID);
    receiving, at the first storage appliance, a migration command to move the data from the first volume managed by the first storage appliance to a second volume managed by a second storage appliance;
    converting, via the second storage appliance, the representation volume that is configured to be managed by the second storage appliance into the second volume, wherein converting the representation volume into the second volume includes:
        defining the representation volume that is configured to be managed by the second storage appliance as the second volume, and
        increasing, via the appliance management layer, a storage capacity of the second volume; and
    migrating the data from the first volume to the second volume.

8. The computer program product of claim 7, wherein generating the first volume for the first storage appliance includes generating the first volume in a cluster management layer of the plurality of storage appliances.

9. The computer program product of claim 7 wherein generating the representation volume for each other storage appliance of the plurality of storage appliances includes generating the representation volume in one or more of an appliance management layer of each storage appliance of the plurality of storage appliances and a front-end driver of each storage node of each storage appliance of the plurality of storage appliances.

10. The computer program product of claim 7, wherein generating the first volume includes associating at least one of a NSID and a NGUID with the first volume.

11. The computer program product of claim 10, wherein generating the representation volume includes storing at least one of the NSID of the first volume and the NGUID of the first volume at the representation volume as the at least one of the NSID of the representation volume and the NGUID of the representation volume.

12. The computer program product of claim 7, wherein the operations further comprise:
in response to migrating the data from the first volume to the second volume, converting, via the first storage appliance, the first volume into a representation volume configured to be managed by the first storage appliance.

13. A computing system comprising: one or more memories; and one or more processors configured to:
generate, at a first storage appliance of a plurality of storage appliances, a first volume that is configured to be managed by the first storage appliance, wherein data within the first volume is accessible by the first storage appliance;
in response to generating the first volume, generate, at each other storage appliance of the plurality of storage appliances, a representation volume that is configured to be managed by a respective storage appliance of the plurality of storage appliances, wherein the representation volume is further configured to consume a minimal amount of memory at an appliance management layer associated with the storage appliance and is further configured to only store information required to respond to at least one of an identify active namespace list NVMe command and an identify namespace NVMe command, wherein the representation volume includes at least one of a namespace ID (NSID) and a Namespace Globally Unique Identifier (NGUID);
receive, at the first storage appliance, a migration command to move the data from the first volume managed by the first storage appliance to a second volume managed by a second storage appliance;
convert, via the second storage appliance, the representation volume that is configured to be managed by the second storage appliance into the second volume, wherein the one or more processors are configured to convert the representation volume into the second volume by:
defining the representation volume that is configured to be managed by the second storage appliance as the second volume, and
increasing, via an appliance management layer, a storage capacity of the second volume; and
migrate the data from the first volume to the second volume.

14. The computing system of claim 13, wherein generating the first volume for the first storage appliance includes generating the first volume in a cluster management layer of the plurality of storage appliances.

15. The computing system of claim 13, wherein generating the representation volume for each other storage appliance of the plurality of storage appliances includes generating the representation volume in one or more of an appliance management layer of each storage appliance of the plurality of storage appliances and a front-end driver of each storage node of each storage appliance of the plurality of storage appliances.

16. The computing system of claim 13, wherein generating the first volume includes associating at least one of a NSID and a NGUID with the first volume.

17. The computing system of claim 16, wherein generating the representation volume includes storing at least one of the NSID of the first volume and the NGUID of the first volume at the representation volume as the at least one of the NSID of the representation volume and the NGUID of the representation volume.

* * * * *